(No Model.)
A. HIRSHHEIMER.
HARROW.
No. 305,592. Patented Sept. 23, 1884.
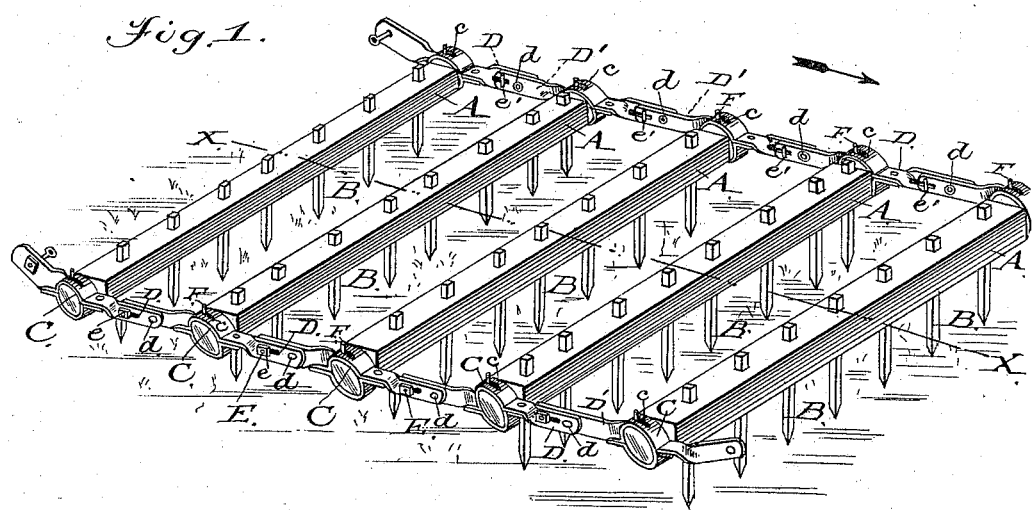
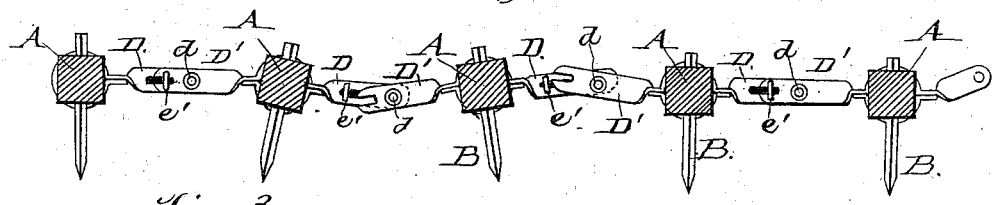
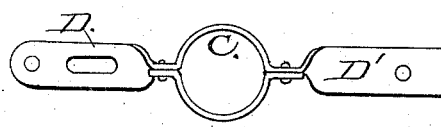 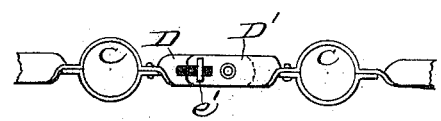
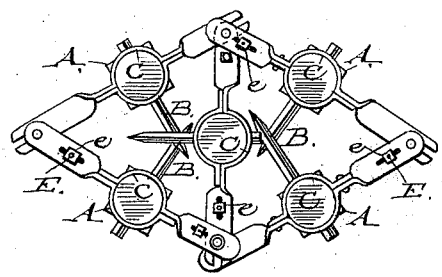
Attest:
J. Walter Fowler
H. B. Applewhaite,
Inventor;
Albert Hirshheimer
per Attys.
A. H. Evans & Co.

UNITED STATES PATENT OFFICE.

ALBERT HIRSHHEIMER, OF LA CROSSE, WISCONSIN.

HARROW.

SPECIFICATION forming part of Letters Patent No. 305,592, dated September 23, 1884.

Application filed January 30, 1884. (No model.)

*To all whom it may concern:*

Be it known that I, ALBERT HIRSHHEIMER, of La Crosse, in the county of La Crosse and State of Wisconsin, have invented a new and useful Improvement in Harrows, of which the following is a full, clear, and exact description, reference being had to the accompanying drawings, making a part of this specification, in which—

Figure 1 is a perspective view of a harrow with my improvements attached. Fig. 2 is a section through line $x$ $x$, Fig. 1, showing part of the harrow rigid and a part flexible, and with some of the teeth perpendicular and some slanting. Fig. 3 is an enlarged view of one of the connecting-links. Fig. 4 shows the flexible joint detached from the harrow. Fig. 5 is an end view of the harrow folded for transportation.

My invention relates to harrows adapted for use on both smooth and uneven ground; and it consists in the combination of devices hereinafter explained and claimed.

To enable others skilled in the art to make and use my invention, I will proceed to describe the exact manner in which I have carried it out.

In the drawings, A represents the beams of the harrow, and B the teeth, constructed in any well-known manner. The end of each beam is made round, and is fitted with a metal band, C, (see Fig. 4,) in which the end of the beam freely turns. This band, fitting around the ends of the beam, guards against the possibility of splitting the beam when striking against stones, grubs, or other obstructions. On opposite sides and forming a part of the band are links D D', pivoted together at $d$. The link D is provided with a longitudinal slot, in which slides a short screw-bolt, E, provided with a nut, $e$, and elongated head $e'$. The link D' is bifurcated or slotted at its end, corresponding to the slot in the link D, so that when the two links are brought into line the two slots exactly register, and the screw-bolt may be passed through both links, and the nuts tightened, so as to bind the links together and destroy all flexibility in the connections between the beams. By simply loosening the nut and slipping back the bolt out of the slot in the end of the link D' the harrow is converted from a rigid into a flexible harrow; or a part may be made rigid and a part flexible, and in a moment too, by simply changing the position of the nuts, thus adapting the harrow to work on any kind of ground. On the upper portion of the band C is provided a slot, $c$, through which passes a stop, F, secured to the end of the beam, and which controls the movement of the band around the end of the beam, or of the beam turning within the band, as it is evident that the beam can only turn the length of the slot $c$, as the stop F is then brought up against one end or the other of the slot and further movement is arrested. When the draft is in one direction, the position of the stop holds the teeth in a vertical position; but changing the draft to the other end of the harrow and in the direction of the arrow, the teeth will assume a slanting position, thus enabling the operator to change from vertical to slanting teeth by simply attaching his animal to the opposite end of the harrow.

Having thus described my invention, what I claim as new, and desire to secure by Letters Patent, is—

1. In a harrow, and in combination with the pivoted beams A, provided with the teeth B and stops F, the herein-described links D D' and bands C, formed in one piece, the said bands being also slotted in their upper faces for reception of the stops, substantially as and for the purpose herein set forth.

2. The harrow-beams A, provided with the teeth B and stops F, in combination with the slotted bands C and the pivoted and slotted links D D', formed in one piece, and screw-bolt E, provided with the nut $e$, all constructed to operate substantially as and for the purpose set forth.

ALBERT HIRSHHEIMER.

Witnesses:
GEO. J. JOHNSON,
EUGENE H. THOMAS.